Oct. 19, 1926.
D. O. MILLER
ATTACHMENT FOR STOVES
Filed Sept. 26, 1925
1,604,062
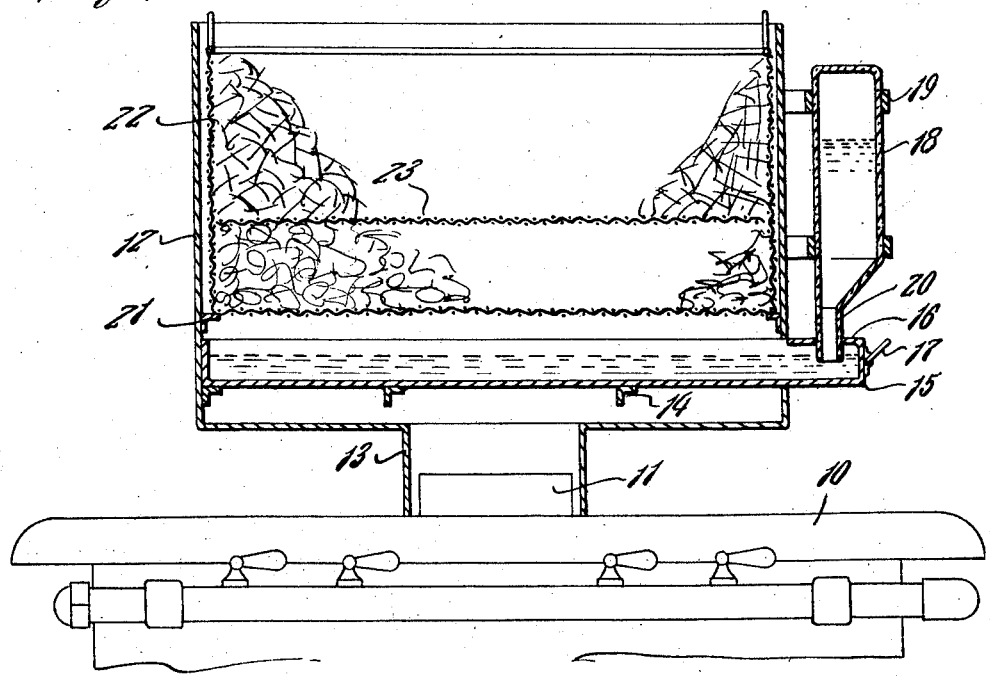
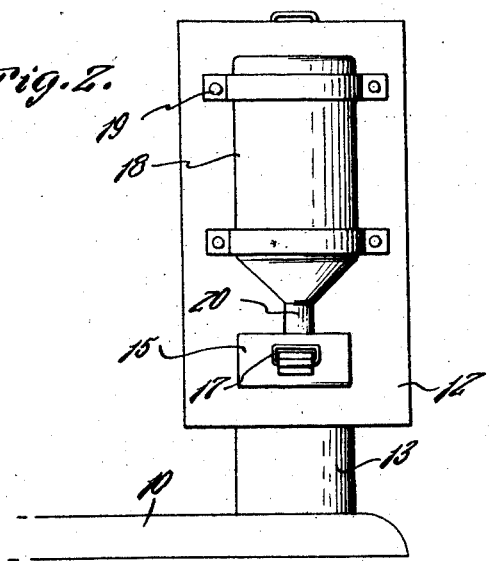
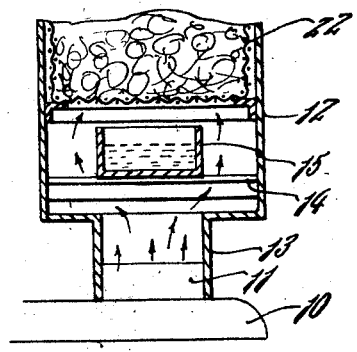
D. O. Miller
INVENTOR
BY Victor J. Evans
ATTORNEY Patented Oct. 19, 1926.

1,604,062

UNITED STATES PATENT OFFICE.

DANA O. MILLER, OF READING, MASSACHUSETTS.

ATTACHMENT FOR STOVES.

Application filed September 26, 1925. Serial No. 58,831.

This invention relates to improvements in means readily and easily attachable upon stove and gas ranges in order that the heat passing through the vents thereon will be cooled and all dirt and odors absorbed within the attachment whereby sweaty walls and odorous kitchens contaminating the entire house may be eliminated.

Another object of my invention resides in the construction of my invention in providing a water pan directly above and in proximity with the vent or flue of the stove or gas range in order that the heat thus emitted from the vent will pass off in the form of vapor and through a container filled with charcoal and coke for removing all dirt and odor in the vapor.

With the above and other objects in view, the invention further includes the following novel features and details of construction, to be hereinafter more fully described, illustrated in the accompanying drawing and pointed out in the appended claim.

In the drawing:—

Figure 1 is a fragmentary elevation of my invention as applied upon the gas range.

Figure 2 is an end elevation thereof.

Figure 3 is a fragmentary end view of my invention as applied upon the flue of a gas range.

Referring to the drawings in detail, wherein like characters of reference denote corresponding parts, the reference character 10 indicates a gas range having a flue or vent, as indicated at 11, provided upon its upper side with means for emitting the heat from a range 10. All of the above is of the usual and well known construction, and forms no part of the present application for Letters Patent but is merely shown for purposes of illustration in bringing forward the novel advantages of the above entitled invention.

The invention resides in the provision of a substantially rectangular casing 12 having a sleeve 13 provided upon its under side and centrally thereof for the reception of the flue 11 therein whereby the heat thus emitted from the flue or vent 11 is received within the casing 12.

Extending within one end of the casing 12 and supported upon a plurality of transversely disposed supporting angle bars 14 is an elongated pan 15 having its outer end, as clearly illustrated in Figure 1 of the drawing, extending outwardly from the corresponding ends of the casing 12 and having an apertured cover plate 16 thereon while a handle 17 is provided upon its outer free end for facilitating the manipulation of the pan 15 within the casing 12. A fountain reservoir supported upon the corresponding end of the casing 12 by strap iron 19 and having a reduced neck portion 20 upon its lower end received within the apertured cover plate 16 of the elongated pan 15 supplies the necessary volume of water to the latter. It is noted that this arrangement and coordination of the pan 15 and reservoir 18 therefor, is similar in construction and operation to the drinking fountains now used in poultry establishments.

Also supported within the casing 12 directly above the pan 15 therein and upon angle bars or irons 21 is a rectangularly shaped reticulated container 22 divided by a partition 23 into upper and lower compartments, each of which is adapted to contain absorbent material as illustrated.

In the operation of the present invention it is clearly apparent and manifest that when a burner is ignited upon the gas range 10, in the oven provided therein, not shown, the heat thrown off will be emitted through the flue or vent 11 into the casing 12 and heat the bottom of the pan 15 which in turn will throw off vapors which when progressing through the reticulated container 23 will have all dirt removed by passing through the layer of coke and the odors thereof filtered through the charcoal.

Having described my invention what is claimed is:—

A stove attachment of the character described comprising a casing having an opening in the bottom thereof, an annular flange depending from the edge of said opening and adapted to associate the attachment with the vent of the stove, a plurality of transverse bars arranged within the casing, a water receptacle supported on said bars in spaced relation to the bottom of said casing, and insertable within the latter through an opening in one side thereof, said receptacle projecting beyond said side, an inverted water reservoir supported on the casing with its mouth received by said receptacle, a foraminated basket supported within the casing in spaced relation above the water receptacle, a horizontal partition dividing the basket into separate compartments, and absorbent materials arranged in the respective compartments for the purpose specified.

In testimony whereof I affix my signature.

DANA O. MILLER.